United States Patent [19]
Henke

[11] Patent Number: 5,092,746
[45] Date of Patent: Mar. 3, 1992

[54] AIR-OPERATED LUBRICANT PUMP

[75] Inventor: Franz O. Henke, Burggen, Fed. Rep. of Germany

[73] Assignee: Pressol Schmiergeräte GmbH, Nürnberg, Fed. Rep. of Germany

[21] Appl. No.: 492,069

[22] Filed: Mar. 12, 1990

[30] Foreign Application Priority Data

May 19, 1989 [DE] Fed. Rep. of Germany ....... 3916422

[51] Int. Cl.$^5$ .............................................. F04B 9/12
[52] U.S. Cl. ..................................... 417/403; 91/337; 91/346
[58] Field of Search .................... 91/337, 346; 417/403

[56] References Cited

U.S. PATENT DOCUMENTS

| | | | |
|---|---|---|---|
| 2,258,493 | 10/1941 | Hull | 91/337 |
| 2,707,456 | 5/1955 | Schweisthal | 91/337 |
| 3,548,717 | 12/1970 | Passaggio | 91/337 |
| 4,079,660 | 3/1978 | Ives | 91/337 |

FOREIGN PATENT DOCUMENTS

| | | |
|---|---|---|
| 39418 | 11/1981 | European Pat. Off. . |
| 3527925 | 5/1987 | Fed. Rep. of Germany . |

Primary Examiner—Gerald A. Michalsky
Attorney, Agent, or Firm—Clement and Ryan

[57] ABSTRACT

A lubricant pump that includes a pneumatic piston motor operated by compressed air, and is equipped with a control device that utilizes a slide valve mounted for reciprocal axial movement on the piston rod. A radially acting spring locking mechanism includes two index grooves spaced from each other axially along the piston rod, separated by the same predetermined distance that separates a first air inlet position and a second air inlet position of the piston slide valve. A helical compression spring is contained in a cavity within the piston slide valve. Axial movement of the reciprocating piston rod in one direction compresses the spring and releases the locking mechanism, whereupon the compressed spring immediately expands and moves the slide valve from one of its air inlet positions to the other of those positions.

Four annular, substantially airtight, slidable contacts are provided to isolate the helical compression spring and the releasable locking mechanism from compressed air flowing into, and air at lower pressure flowing out of, the control device.

28 Claims, 4 Drawing Sheets

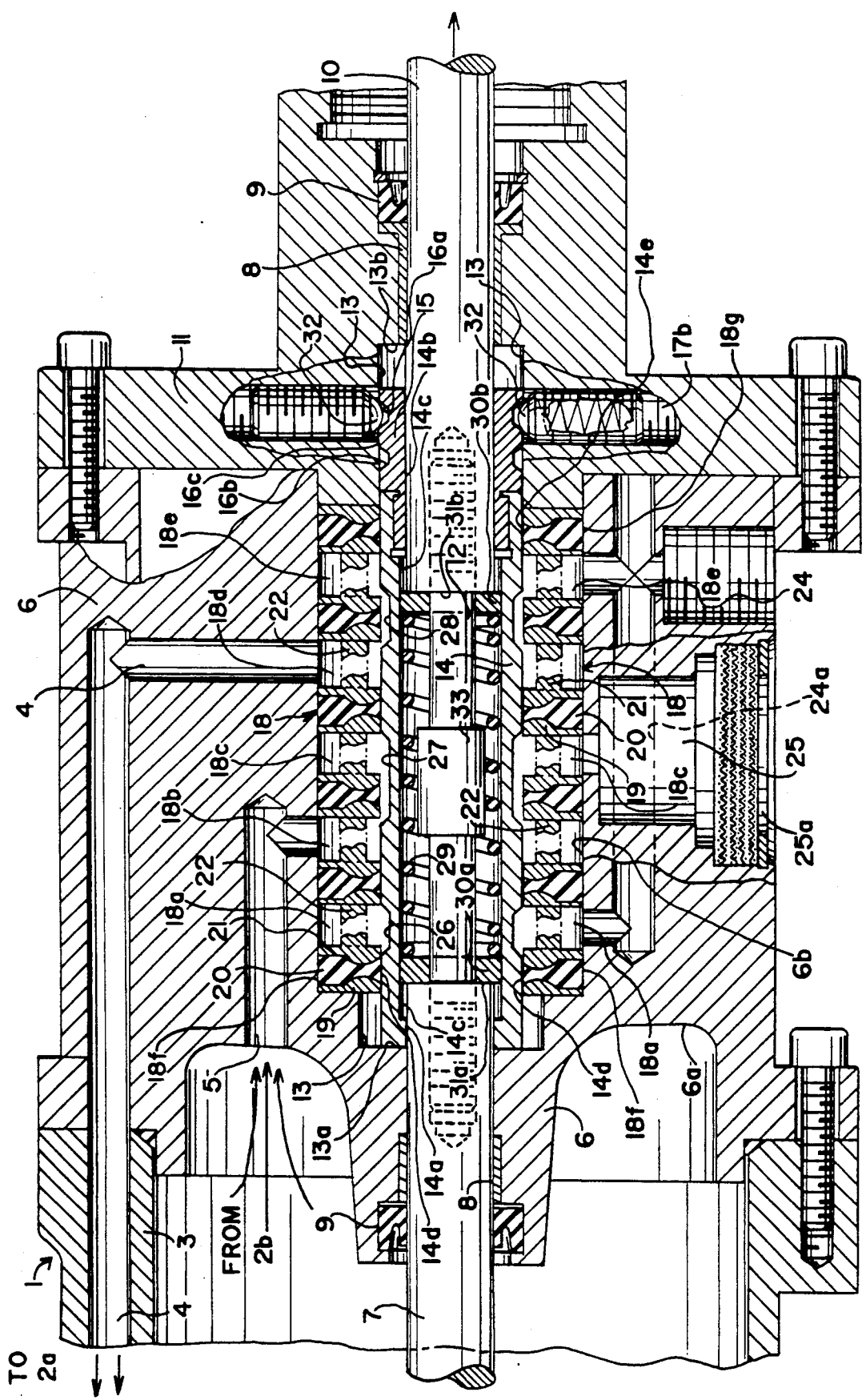

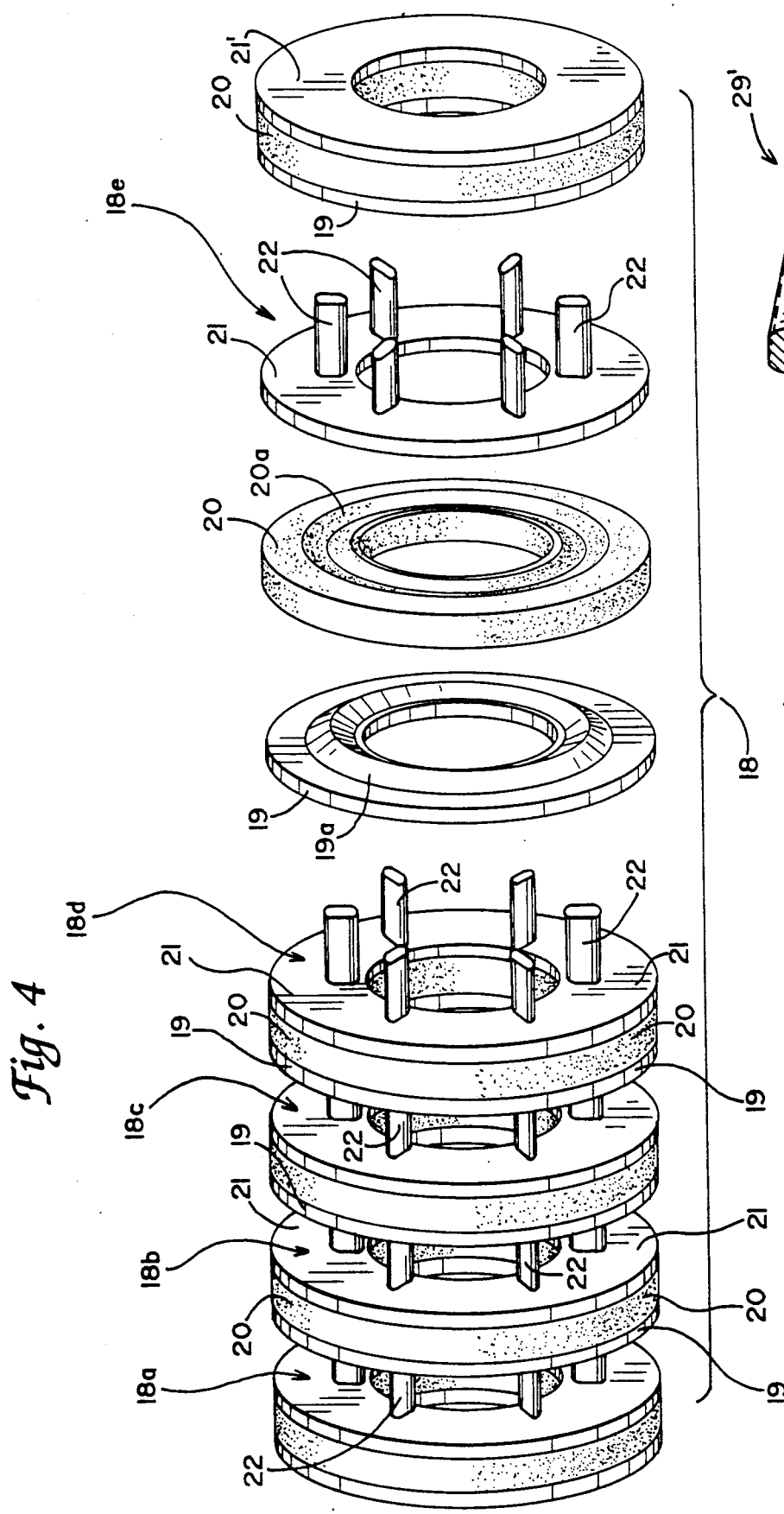

AIR-OPERATED LUBRICANT PUMP

FIELD OF THE INVENTION

This invention relates to a lubricant pump that delivers lubricant from a lubricant source to an outlet bore, and more particularly such a pump in which the reciprocating movement of the piston rod of the pump is produced through the use of compressed air.

BACKGROUND OF THE INVENTION

In one air-operated lubricant pump known in the prior art, disclosed in European patent No. EP-OS 0 039 418, a rotary slide valve that alternates the side of the piston on which compressed air is introduced is connected to the reciprocating piston rod of the pump by means of a slideway, and every time the piston rod moves to one of its end positions the rotary slide valve changes its angular position through the pressure of a hairpin spring. Between the end positions of the piston rod, the rotary slide valve is kept in its desired angular position by means of a control bar. Compressed air is introduced into a tubular chamber in which the slide valve moves, and is routed through ports in a front wall of the tubular chamber.

One of the shortcomings of this prior art device is that a hairpin spring, which relies on a single bend, is more susceptible to failure than a spring of the type employed in the present invention, i.e., a helical compression spring. A second shortcoming is that in this prior art device compressed air flows constantly around the hairpin spring, and this continued exposure to compressed air decreases the useful life of the spring. Another shortcoming is that the installation of this prior art control device is quite difficult.

Another type of air-operated lubricant pump, disclosed in German patent No. 35 27 925, is one in which an axially movable slide valve is utilized to change the side of the piston on which compressed air is introduced, as the piston moves forward and backward to produce a pumping action. This prior art device is not automatically operated, but relies on manual operation of a two-position valve for introduction of compressed air into the device. The cylindrical slide valve has a complicated arrangement of air passages extending through its walls. Because of the construction of this prior art device, the reversal of direction of the reciprocating piston rod is effected by pressure differences within the slide valve, which makes a waiting period necessary for the individual air passages and chambers to be aerated and de-aerated before the piston rod reverses its direction.

The air-operated lubricant pump of the present invention avoids the indicated shortcomings of the prior art, and provides reliable, economical and automatic reciprocating movement of the piston rod with a minimum of maintenance for long periods of time. The manufacture of the device is much simpler than the manufacture of the second prior art device just discussed, because there is no necessity to cast or bore any maze-like passages through the walls of the cylindrical slide valve, as is the case with the prior art device in question.

SUMMARY OF THE INVENTION

The mechanism of this invention includes a slide valve mounted for axial movement, (1) back and forth on the piston rod of a lubricant pump, and (2) within a slide valve-receiving chamber in a control casing that is attached to the pneumatic cylinder of a reciprocating piston. The piston slide valve has the general form of a hollow cylinder with an imperforate wall. The external surface of the cylindrical wall of the slide valve defines, a plurality of annular air channeling grooves in axially spaced positions that provide interconnection of the air inlet port with either a forward stroke conduit or a return stroke conduit, which conduits lead to opposite sides of the compressed air piston of the pump. There are preferably three such grooves, each of which extends continuously, without interruption, around the slide valve, and lies in a single plane positioned at right angles to the longitudinal axis of the valve.

Which of the conduits is thus connected with the air inlet port depends upon whether the slide valve is in a first air inlet position or in a second air inlet position. These positions are separated by a first predetermined distance measured, along the piston rod.

The slide valve has an inwardly directed flange a portion at each end that is positioned in close radial proximity to the reciprocating piston rod, and a central portion lying between these end portions that is spaced from the piston rod to form an elongated cavity of annular cross section between the piston rod and the cylindrical inner wall of the slide valve.

Sets of annular intermediate air passages are formed within the control casing (preferably immediately adjacent the piston slide valve) which cooperate with selected pluralities of the air channeling grooves on the external surface of the piston slide valve. When the slide valve is in its first air inlet position, one set of annular, substantially airtight, intermediate air passages is formed which helps define a first air entry path and an associated first air exit path. When the slide valve is in its second air inlet position, another set of annular, substantially airtight, intermediate air passages is formed which helps define a second air entry path and an associated second air exit path.

The element that forms these airtight, intermediate air passages has an inwardly facing surface that makes an annular, substantially airtight, slidable contact with the outer surface of each end portion of the piston slide valve. In addition, it has an outwardly facing surface that makes an annular, substantially airtight contact with the inner wall of the control casing adjacent each of the opposite ends of the slide valve. This arrangement of parts provides a slide valve-receiving channel within the control casing. The four contacts are at all times located farther axially from the central portion of the slide valve-receiving channel than are (1) the channeling grooves on the slide valve, (2) all the intermediate air passages, and (3) all openings in the inner wall of the control casing that lead away from the passage-forming element.

The four annular, substantially airtight contacts just described substantially isolate the interior space within the slide valve from (1) compressed air that enters the air inlet port and passes through one of the first and second air entry paths described above, and (2) outflowing air at lower pressure that passes through the air exit path associated with that one air entry path, and from there out through the air discharge port. By the same token, these four annular, substantially airtight contacts preferably isolate the slide valve releasable holding means described just below from the compressed air that flows into, and from the air under lower pressure that flows out of, the mechanism of this invention.

The mechanism of this invention includes means for releasably holding the piston slide valve in one or the other of its first and second air inlet positions, which positions are separated by the above mentioned first predetermined distance measured between their center lines and along the piston rod. The length of the slide valve-receiving chamber in the control casing that is referred to above is at least substantially equal to the external length of the slide valve plus this predetermined distance between the first and second air inlet positions of the slide valve. The holding means is adapted to be released by the application to the slide valve of an axially directed force of at least a predetermined minimum magnitude.

A helical compression spring is positioned within the elongated annular cavity in the piston slide valve. This spring is adapted, when in a compressed condition, to apply an axially directed force to one of the end portions of the slide valve.

First actuator means is positioned on the reciprocating piston rod for pushing the helical compression spring against one of the end portions of the slide valve, when the piston rod moves in a given direction, to place the spring in a compressed condition. Second actuator means is positioned on the reciprocating piston rod for pushing the compression spring against the other slide valve end portion, when the piston rod moves in the opposite direction.

Means is provided for releasing the holding means by applying to the piston slide valve an axially directed force of at least the above mentioned predetermined minimum magnitude, first in one direction and then in the opposite direction, as the reciprocating piston rod moves alternately through its forward stroke and then through its return stroke.

When compressed air is introduced from the air inlet port, through either the forward stroke conduit or return stroke conduit, into the pneumatic cylinder on the side of the compressed air piston that is associated with the conduit in question, the compressed air piston and piston rod will be pushed toward the opposite side of the compressed air piston. Either the first or second actuator means is thereby moved axially to compress the helical compression spring so that when the holding means is released, the compressed spring immediately expands and moves the slide valve from one of its air inlet positions to the other of those positions.

In one embodiment of the mechanism of this invention, the holding means is released by a force applied by the helical spring itself, in a condition in which it is either fully compressed or nearly so. In the preferred embodiment, a third actuator means is fixedly positioned, between the first and second actuator means, on the portion of the reciprocating piston rod that is located within the annular cavity of the slide valve. This third actuator means applies to one of the end portions of the slide valve an axially directed force of at least the predetermined minimum magnitude that is required for release of the holding means.

Other features and specific forms of the mechanism of this invention are disclosed below.

BRIEF DESCRIPTION OF THE DRAWING

The invention will now be described in more detail by reference to the accompanying drawing, in which:

FIG. 3 is a fragmentary cross-section of the mechanism of FIG. 1 showing the piston slide valve after it has moved to its forward stroke position, with the reciprocating piston rod moving to the right to carry out its forward stroke;

FIG. 4 is an enlarged, partially exploded, three-quarters perspective view of certain elements that in the preferred embodiment of this device define intermediate air channeling passages that connect the compressed air inlet port first with one side of the compressed air piston and then with the other side of the piston; and FIG. 5 is an enlarged, fragmentary sectional view of one form of helical compression spring that may be used to advantage in a second embodiment of the mechanism of this invention; and FIG. 6 is a fragmentary sectional view of a third embodiment of the mechanism of this invention with the helical compression spring shown in its fully compressed condition.

DETAILED DESCRIPTION OF ILLUSTRATIVE EMBODIMENTS

Preferred Embodiment

Figure 1:
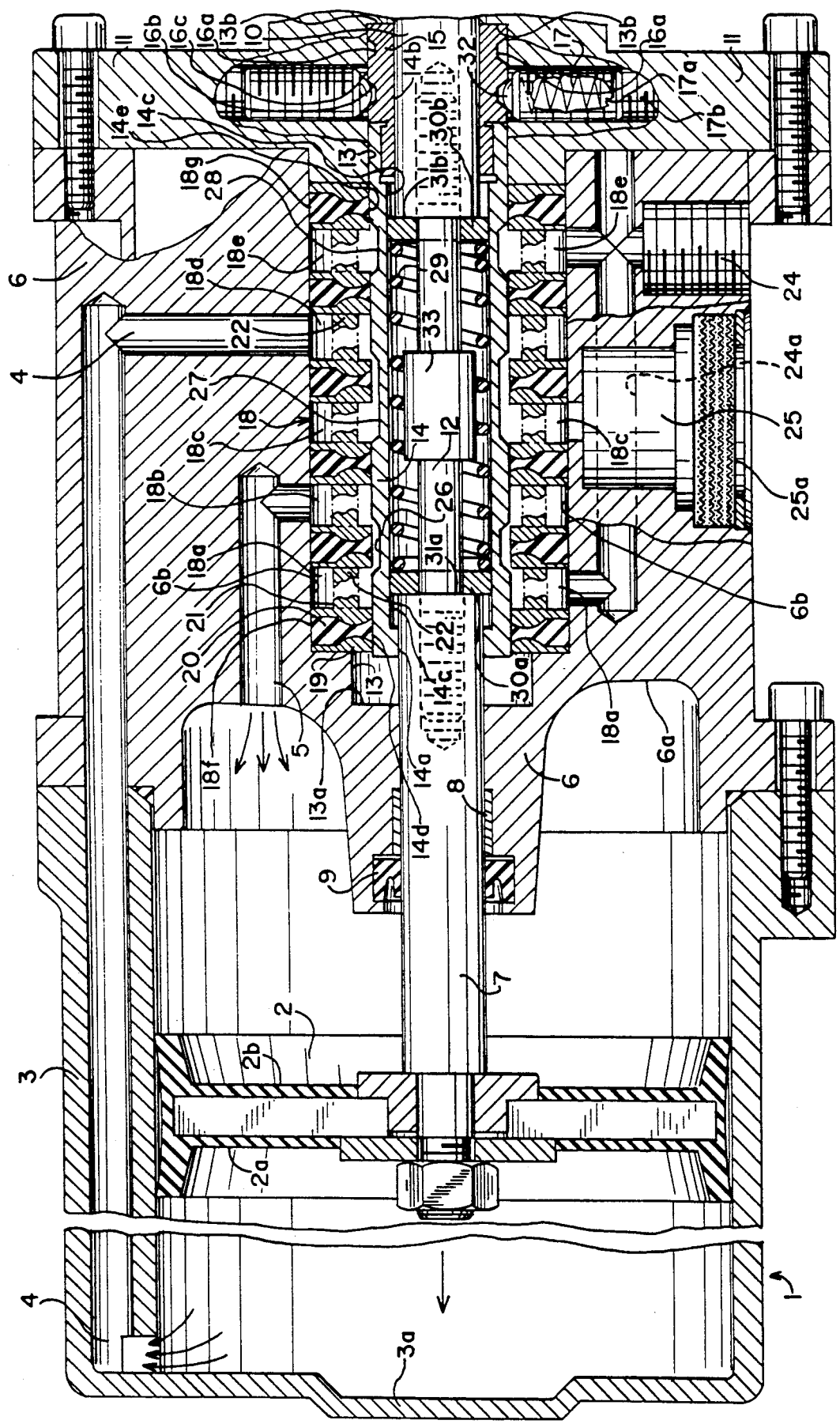
FIG. 1 is a fragmentary cross-section of a preferred embodiment of the compressed air-operated mechanism for the reciprocating piston rod of a lubricant pump according to the present invention, with the reciprocating piston rod in the middle of its return stroke and moving to the left to complete its return stroke.

The sectional view of FIG. 1 illustrates a preferred embodiment of a compressed air-operated mechanism for the reciprocating piston rod of a lubricant pump in accordance with this invention. In this view the reciprocating piston rod of the pump is carrying out its return stroke.

General Construction

The air-operated mechanism illustrated in FIG. 1 includes pneumatic cylinder 1, which comprises side wall 3 and end wall 3a. Compressed air piston 2 performs reciprocating axial movement within cylinder 1 as compressed air is introduced first on left-hand side 2a, and then on right-hand side 2b, of the piston. Compressed air piston 2 has an airtight, slidable contact with the internal surface of side wall 3 of cylinder 1. Reciprocating piston rod 7 carries at its opposite end 10 a working extension piece (not shown), which is the piston of the lubricant pump.

In the embodiment shown, compressed air piston 2 has a large diameter, and the piston of the lubricant pump with which this mechanism is used has a smaller diameter, to produce high pressure. The relative size of the pistons at each end of piston rod 7 may of course be varied, in a manner well known, depending upon the level of pressure desired in the pump.

The mechanism of FIG. 1 is completed by control casing 6, attached to pneumatic cylinder 1, and the control device contained in that casing. As best seen in FIG. 1, wall 6a of control casing 6 forms one end of pneumatic cylinder 1. The control casing terminates at its opposite end in flanged neck 11.

Piston rod 7 is slidably journaled in the walls of control casing 6 (both in the main body of the control casing and in flanged neck 11) for reciprocating axial movement between a forward position and a return position. Piston rod 7 is guided by bushings 8 and sealed by means of packing rings 9, located at each end of casing 6 (see FIGS. 1–3).

The walls of control casing 6 contain compressed air inlet port 24 and air discharge port 25. Inlet port 24 is adapted to supply compressed air to the control device contained within control casing 6. Forward stroke conduit 4, formed in the walls of control casing 6 and in wall 3 of pneumatic cylinder 1, leads from the control device to the left-hand side 2a of compressed air piston 2. Return stroke conduit 5, in the wall of control casing 6, leads to the other side 2b of piston 2.

Piston Slide Valve

Piston slide valve 14 lies at the center of the control device contained in casing 6. Slide valve 14 has the general form of a hollow cylinder with an imperforate wall. The external surface of the generally cylindrical wall of slide valve 14 defines a plurality of annular air channeling grooves 26, 27 and 28 spaced axially from each other on that surface. As will be described in more detail below, grooves 26, 27 and 28 provide interconnection of air inlet port 24 with either forward stroke conduit 4 or return stroke conduit 5, depending upon the position of the slide valve within control casing 6.

Slide valve 14 has a first air inlet position (seen in FIG. 3) in which it connects air inlet port 24 to forward stroke conduit 4, and air discharge port 25 to return stroke conduit 5. The term "forward stroke" is used in connection with the Figures of the drawing to refer to movement of piston rod 7 towards the right side of the Figure, and the term "return stroke" is used to refer to movement of the piston rod to the left. The slide valve has a second air inlet position (seen in FIGS. 1 and 2) in which it connects air inlet port 24 to return stroke conduit 5, and air discharge port 25 to forward stroke conduit 4. The two air inlet positions of the slide valve are separated by a first predetermined distance. The slide valve is movable back and forth along piston rod 7 within slide valve-receiving chamber 13 in control casing 6, between the two air inlet positions of the slide valve just described.

Each end of slide valve 14 has an inwardly directed flange portion that lies in close radial proximity to reciprocating piston rod 7 at end portions 14a and 14b, when the piston rod is in its midposition between its forward and return positions. The slide valve moves along the piston rod within chamber 13, which extends around and along piston rod 7 within control casing 6.

The length of slide valve-receiving chamber 13 is at least substantially equal to the external length of slide valve 14 plus the first predetermined distance separating the first and second air inlet positions of the slide valve. This relationship can best be seen at the left end of the slide valve in FIGS. 1 and 2, and at the right end of the slide valve in FIG. 3. As will be seen the spaces that are provided between the right and left ends of the slide valve and the corresponding inner end walls of slide valve-receiving chamber 13 allow the slide valve to move axially, during the operation of the mechanism of this invention, from its first air inlet position (FIG. 3) toward the right to its second air inlet position (FIGS. 1 and 2), and back again at the left. In the embodiment of this invention shown in FIGS. 1–4, grooves 26, 27 and 28 extend continuously, without interruption, around the piston slide valve. Each of the grooves lies in a single plane positioned at right angles to the longitudinal axis of the slide valve.

Releasable Holding Means

Part 15 of end portion 14b of the slide valve —together with three locating elements 32 (of which two are indicated in FIG. 1) that are spaced circumferentially around part 15 in a plane normal to the longitudinal axis of the slide valve—comprise a spring-locking mechanism. This mechanism holds the slide valve releasably in either its first or its second air inlet position.

The external surface of part 15 of the slide valve includes two index means 16a and 16b, in the form of grooves extending circumferentially around the slide valve. The center lines of these grooves are spaced from each other along the external surface of the slide valve by the above mentioned first predetermined distance that separates the slide valve's first and second air inlet positions. When the spacing of any two indexing elements such as grooves 16a and 16b is referred to in this specification or in the claims, it is the spacing of the center lines of the two elements that is referred to.

Each locating element 32 comprises a spring-biased spherical ball positioned within the walls of control casing 6. The spring loading of the spherical balls is provided by helical compression springs 17 (one of which is shown in the broken-away view in the lower right-hand portion of FIG. 1) that press the balls radially toward slide valve 14 to position the balls normally within either index groove 16a or 16b.

When spring-loaded spherical locating balls 32 are seated in groove 16a (as in FIG. 3), slide valve 14 is in its first air inlet position. When locating elements 32 are seated in groove 16b (as in FIGS. 1 and 2), the slide valve is in its second air inlet position.

Figure 2:
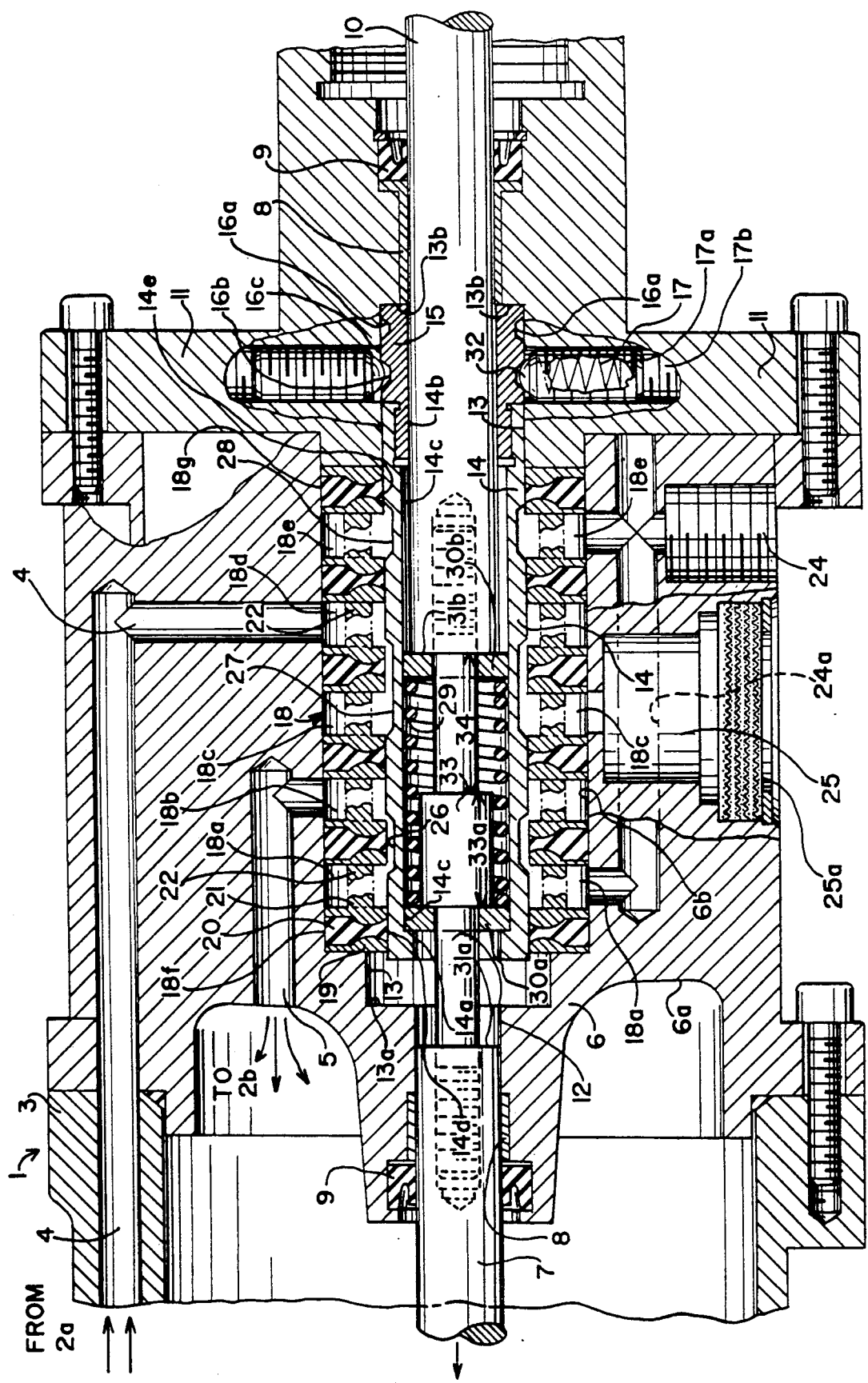
FIG. 2 is a fragmentary cross-section of the mechanism of FIG. 1 in which the reciprocating piston rod has moved farther to the left and has very nearly reached the end of its return stroke.

When an axially directed force is applied to slide valve 14 to move it to the left in slide valve-receiving chamber 13 from the position shown in FIGS. 1 and 2 to the position shown in FIG. 3, the holding action of spring-locking mechanism 16b/32 can be overcome only if the axially directed force is sufficiently large. In other words, the axially directed force must be of at least a predetermined minimum magnitude.

The minimum axially directed force required to release spring-loaded mechanism 16b/32 depends, as can be seen, upon the magnitude of the force applied radially against spherical locating balls 32 by compression springs 17. In the preferred embodiment illustrated, the radially directed pressure exerted by springs 17 on spherical balls 32 can be adjusted by rotation, in one angular direction or the other, of the associated adjusting members 17a, which are in threaded engagement with the walls of the respective access ducts 17b. Each access duct extends to the external surface of the circular flange of flanged neck member 11 that comprises the end wall of control casing 6. This makes each adjusting member 17a accessible to a tool inserted in the duct from outside the mechanism.

Helical Compression Spring

As already stated, end portions 14a and 14b of slide valve 14 are in close proximity to piston rod 7. The central portion of the slide valve lying between end portions 14a and 14b is spaced from the piston rod to form an elongated cavity 14c of annular cross section within the interior of the slide valve between the piston rod and the wall of the generally cylindrical slide valve. Helical compression spring 29 is located in this cavity.

In the embodiment shown, piston rod 7 comprises two rod elements on the left-hand and right-hand sides of FIG. 1, with one intermediate piece 12 between these two rod elements. Intermediate piece 12 of piston rod 7 has a reduced diameter compared to the rod elements on either side of the intermediate piece. As will be seen, this intermediate section 12 enlarges the inner radial dimension of elongated annular cavity 14c within slide valve 14, thus contributing to the space for compression spring 29.

Each of the portions of reciprocating piston rod 7 that lies on either side of reduced portion 12 of the piston rod forms a shoulder 31 at the point where it joins the reduced portion. An annular shaped washer 30 is slidably carried by reduced portion 12 of the piston rod adjacent each shoulder 31. (Members 30a and 31a are on the left-hand side, and members 30b and 31b are on the right-hand side, of FIGS. 1-3.) Each of these washers has an outside diameter that is larger than the inside diameter of end portions 14a and 14b of slide valve 14 that are closely adjacent reciprocating piston rod 7, thus ensuring contact between these end portions and the washers when they move axially toward each other. In order to ensure that contact will be made between a washer 30 and helical compression spring 29 when those members move axially toward each other, each washer 30 has an inside diameter that is smaller than the outside diameter of helical compression spring 29. (In FIGS. 1-3, as will be seen, the preferable inside diameter of each washer 30 is still smaller than just specified, being only slightly larger than the diameter of reduced portion 12 of piston rod 7 on which it slides.)

As a result of the dimensions just indicated, an axially directed force, as for example a force directed to the left by shoulder 31b on the right-hand side of FIG. 1 as piston rod 7 moves to the left, will be transmitted to the associated washer 30b and from there to the helical compression spring. The helical compression spring will then apply this force to washer 30a at the left end of reduced intermediate portion 12 of the piston rod, and will push the latter washer against inwardly directed end portion 14a of slide valve 14 after the piston rod has moved a short distance to the left from the position it occupies in FIG. 1.

The continued movement of piston rod 7 to the left will cause washer 30a to slide along reduced intermediate portion 12 of piston rod 7 (to the right relative to the rod), thereby further compress helical compressing spring 29 between the two washers 30a and 30b at each end of the spring. As seen in FIG. 2, at this point washer 30a is exerting a force directed to the left against end portion 14a of slide valve 14, while the other end of the slide valve is held by the holding mechanism comprised of spring-loaded spherical balls 32 in engagement with index groove 16b.

First, Second and Third Actuators

From the foregoing discussion, it will be seen that shoulder 31b on the right hand in FIG. 2 acts as an actuator for pushing compression spring 29 against end portion 14a of slide valve 14 when piston rod 7 moves to the left in that Figure. This places helical compression spring 29 in a compressed condition.

In a similar manner, as piston rod 7 moves toward the right from its position in FIG. 3, shoulder 31a at the left end of intermediate reduced portion 12 of piston rod 7 will push against washer 30a, which will then push helical compression spring 29 to the right against washer 30b, and this will push washer 30b against end portion 14b of slide valve 14. As left-hand shoulder 31a continues to move to the right in FIG. 3, helical compression spring 29 will be placed in a compressed condition in the same way as shown in FIG. 2 for movement of piston rod 7 to the left.

In the preferred embodiment of this invention shown in FIGS. 1-3, third actuator 33 is positioned in the longitudinal center of intermediate reduced portion 12 of piston rod 7. Third actuator 33 has a diameter larger than the rest of intermediate section 12, but smaller than the inside diameter of helical compression spring 29 so that it can fit concentrically within the spring.

In addition, actuator 33 has an outside diameter larger than the inside diameter of each force-transmitting washer 30, each of which (as mentioned above) has an outside diameter larger than the inside diameter of end portions 14a and 14b of slide valve 14. It follows from these dimensions that as third actuator 33 is carried to the left by piston rod 7 to abut against left-hand washer 30a, that washer will be pushed to the left from its position in FIG. 1 to its position in FIG. 2, and then still farther to the left to apply an axially directed force against end portion 14a of slide valve 14.

As piston rod 7 continues to the left from its position shown in FIG. 2 and the force exerted by third actuator 33 on washer 30a is applied to end portion 14a of slide valve 14, the same axially directed force is transmitted to the other end of the slide valve, where it is exerted on spherical locating balls 32 engaged in groove 16b of the holding mechanism for the slide valve. The spring loading of spherical balls 32 is selected so that the magnitude of the axially directed force required to release the engagement of the spherical balls with groove 16b is substantially less than the axial force exerted by third actuator 33 as piston rod 7 moves to the left in FIGS. 1 and 2. In other words, the force directed to the left by third actuator 33 is substantially greater than the force that is established, or predetermined, as the force necessary to release holding means 16b/32.

As a result, the force supplied by third actuator 33 breaks the engagement of locating elements 32 with index groove 16b, and causes the spherical balls to slide up on land area 16c between index grooves 16b and 16a as the slide valve starts to move to the left in FIG. 2.

At this moment, the force exerted by compressed helical compression spring 29 takes over, and immediately pushes slide valve 14 farther to the left, until the outer end of end portion 14a strikes end wall 13a of chamber 13. At this time, slide valve 14 occupies the position shown in FIG. 3, and at the other end of the slide valve spherical balls 32 have slid to the right across land area 16c into index groove 16a. This position of the slide valve shown in FIG. 3 is its first air inlet position, in which the slide valve connects air inlet port 24 to forward stroke conduit 4, and connects return stroke conduit 5 to discharge port 25. These connections immediately reverse the direction of movement of reciprocating piston rod 7, and cause it to move to the right, as it is already doing in the position shown in FIG. 3.

When the piston rod has moved far enough to the right from the position it occupies in FIG. 3, third actuator 33 will push force-transmitting washer 30b against end portion 14b of slide valve 14 to break the engagement of holding means 16a/32. The force exerted by compressed helical compression spring 29 then immediately takes over and pushes slide valve 14 farther to the right, until end portion 14b is stopped by end wall 13b of chamber 13.

This sequence of events continues as reciprocating piston rod 7 moves back and forth within control casing 6 and pneumatic cylinder 1, first performing its forward stroke, then its return stroke, then again its forward stroke, and so on.

In other words, third actuator 33 functions as a means for releasing holding means 16a/32 or 16b/32, respectively by applying to slide valve 14 an axially directed force of at least the above mentioned predetermined miniumum magnitude, first in one direction and then in the opposite direction, as reciprocating piston rod 7 moves alternately through its forward stroke and then through its return stroke.

Intermediate Air Passages Within Control Casing Adjacent Slide Valve

The connections referred to above that are shown in FIG. 3 between forward stroke conduit 4 and air inlet port 24 on the one hand, and return stroke conduit 5 and air discharge port 25 on the other, are provided by the interaction between (1) air channeling grooves 26, 27 and 28 on the external surface of slide valve 14 and (2) the inner portion of control casing 6 that in this embodiment is formed of a pile 18 of a repeating series of three elements 19, 20 and 21. These three elements are an annular stabilizing disk 19, an annular packing ring 20, and an annular spacing ring 21.

As seen in cross section in FIG. 1 (for example, at the left end of slide valve 14), annular stabilizing disk 19 is flat on one side, and has a low annular molding on the other side that engages an annular depression on the surface of the adjoining packing ring 20. Stabilizing disk 19 is preferably made of metal or a similar strong, stiff material. Packing ring 20 is formed of resiliently compressible plastic or rubber, and protrudes slightly in the inward radial direction with respect to stabilizing disk 19 and spacer 21. Spacer 21 is made of a suitable hard plastic material, and has a low annular molding on one side that engages an annular depression on the surface of the adjoining packing ring 20. On the other side of the spacing ring, duct spacers 22 (which for clarity are shown broken away in FIGS. 1-3) protrude in the axial direction to the adjacent stabilizing ring 19. This partially fills the space between the spacing ring and the adjacent stabilizing ring, and forms intermediate air passages 18a through 18e, which are of generally annular shape and extend around slide valve 14 within control casing 6.

Pile 18 of a repeating series of three elements 19, 20 and 21 is shown in an enlarged, partially exploded, view in FIG. 4. Intermediate air passages 18a, 18b and 18c are shown on the left-hand side of the Figure. When the exploded stabilizing ring 19, packing ring 20 and spacing ring 21 are re-assembled, intermediate air passages 18d and 18e will be formed where indicated.

In the exploded portion of the Figure, stabilizing ring 19 is shown with annular molding 19a on one side, and packing ring 20 is shown with annular depression 20a on one of its surfaces. The opposite side of packing ring 20 has a similar annular depression. Spacing ring 21 has an annular molding on its opposite side that engages depression 20a on packing ring 20 when these elements are assembled in their operative positions.

As will be seen, in the assembled pile 18 projections 22 on each spacing ring 21 extend to the adjacent stabilizing ring 19 to form intermediate air passages 18a-18e of generally annular shape.

In FIGS. 1-3, projections 22 are all shown with their midportions in phantom, to emphasize that most of the space between adjacent stabilizing ring 20 and spacing ring 21 is (as best seen in FIG. 4) entirely open.

The final ring 21' on the right-hand side of FIG. 4 in the position of a spacing ring, but carries no spacing projections 22 and simply performs a stabilizing function. For this reason it is preferably made of metal or a similar strong, stiff material.

In addition to forming intermediate air passages 18a-18e, the inner edges of the of assembled pile 18 of repeated series of three elements 19, 20 and 21 may be considered to form together the major part of the inner wall of slide valve-receiving chamber 13. Or, alternatively, assembled pile 18 of elements 19, 20 and 21 may be thought of as comprising in the aggregate what may be called a "liner" or a "sleeve" that is interposed between inner wall 6b of control casing 6 and piston slide valve 14. However they are characterized, elements 19, 20 and 21 form, as will be described in more detail below, a side valve-receiving chamber within control casing 6.

Interconnection of Three Slide Valve Grooves With Intermediate Air Passages

It is through the interconnection of the above mentioned air channeling grooves 26, 27 and 28 with intermediate air passages 18a through 18e —as the slide valve is caused to move back and forth within chamber 13 as described above—that the full force of the compressed air entering inlet port 24 is directed against side 2a or side 2b, as the case may be, of piston 2. As pointed out above, when the slide valve is in its first air inlet position, it connects air inlet port 24 to forward stroke conduit 4 and connects return stroke conduit 5 to air discharge port 25. When the slide valve is in its second air inlet position, the reverse is true.

Middle air channeling groove 27 on slide valve 14 is wider than end grooves 26 and 28. As will be seen from FIGS. 1 and 3, middle groove 27 is connected at all times—through annular shaped intermediate air passage 18c—to air discharge port 25 in the walls of control casing 6. It will also be seen that each one of grooves 26 and 28, at the ends of the series of three air channeling grooves, is connected at all times—through connecting passageway 24a and from there through annular shaped intermediate air passages 18a and 18e, respectively—to air inlet port 24. The shifting back and forth of slide valve 14 within slide valve-receiving chamber 13 that is described above determines, through the respective positions of grooves 26 and 28, whether forward stroke conduit 4 is connected through air passages 18d and 18e with inlet port 24 (FIG. 3), or whether it is return stroke conduit 5 that is connected through air passages 18b and 18a with the air inlet port (FIGS. 1 and 2).

Groove 28 at the right-hand end of the three air channeling grooves connects forward stroke conduit 4 and air inlet port 24 in the manner just described when slide valve 14 is in its first air inlet position (FIG. 3). This connection introduces the full pressure of the compressed air supplied at inlet port 24 to side 2a of piston 2, which immediately causes the piston to start its forward stroke. When the slide valve is in its second air inlet position, right-hand air channeling groove 28 remains connected with air inlet port 24, but is disconnected from forward stroke conduit 4 (FIGS. 1 and 2). This disconnection blocks the compressed air from applying pressure any longer to side 2a of the piston.

In a similar manner, air channeling groove 26 at the left-hand end of the series of three grooves connects return stroke conduit 5 and air inlet port 24 when slide valve 14 is in its second air inlet position (FIGS. 1 and 2). This connection introduces the full pressure of the compressed air from the air inlet port to side 2b of piston 2, which causes the piston to immediately reverse its direction of movement and start its return stroke. When the slide valve is in its first air inlet position, groove 26 remains connected with inlet port 24, but is disconnected from return stroke conduit 5 (FIG. 3). The compressed air is thus blocked off from side 2b of the piston.

Just as with air inlet port 24, whether air discharge port 25 is connected with forward stroke conduit 4 or with return stroke conduit 5 is determined by the position of slide valve 14 within slide valve-receiving chamber 13, and the resulting position of central air channeling groove 27 of the slide valve with respect to the intermediate air passages in pile 18. As will be seen from FIG. 3, when the slide valve has been pushed to the left end of chamber 13 by the action of helical compression spring 29, it is return stroke conduit 5 that is connected, through air passage 18b and central air passage 18c, with the discharge port. This connection allows air to flow from side 2b of piston 2, as the piston moves to the right, out of pneumatic cylinder 1 through return stroke conduit 5, intermediate air passage 18b, annular air channeling groove 27, intermediate air passage 18c, and finally out of discharge port 25.

As is seen in FIG. 1, when the slide valve has been pushed to the right in chamber 13, it is forward stroke conduit 4 that is connected, through air passage 18d and central air passage 18c, with the discharge port. This connection allows air to flow from side 2a of piston 2, as the piston moves to the left, out of pneumatic cylinder 1 through forward stroke conduit 4, intermediate passage 18d, annular air channeling groove 27, intermediate passage 18c, and finally out of discharge port 25.

(If the compressed air that flows as described in the two immediately preceding paragraphs is allowed to exit freely from discharge port 25, it will create an uncomfortably high noise level. To reduce the noise level, sound absorber 25a is provided in air discharge port 25.)

Slide Valve Grooves And Intermediate Air Passages Confine Air To Defined Paths

One of the most important features of the air-operated pump of this invention, as exemplified by the embodiment being described, is the cooperation of air channeling grooves 26, 27 and 28 on piston valve 14 with intermediate air passages 18a through 18e, and with the inner wall 6b of control casing 6, to confine the flow of air into and out of the control casing solely to the restricted paths that have just been discussed. Depending upon whether the slide valve is in its first or second air inlet position, certain of the intermediate air passages, together with a selected plurality of the grooves on the slide valve, form an air entry path leading from air inlet port 24 to one side or the other of compressed air piston 2, and an associated air exit path leading from the other side of the piston to air discharge port 25.

In this embodiment, when the slide valve is in its first air inlet position (FIG. 3), pile 18 of the repeating series of elements 19, 20 and 21 forms one set of annular, substantially airtight, intermediate air passages 18e/18d and 18b/18c. Annular intermediate air passages 18e and 18d, with annular air channeling groove 28 between them, define a first air entry path within control casing 6 that leads from air inlet path 24 to forward stroke conduit 4. At the same time, annular intermediate air passages 18b and 18c, with annular air channeling groove 27 between them, define a first air exit path within the control casing that leads from return stroke conduit 5 to air discharge port 25.

When the slide valve is in its second air inlet position (FIGS. 1 and 2), elements 19, 20 and 21 form another set of annular, substantially airtight, intermediate air passages 18a/18b and 18d/18c. Annular passages 18a and 18b, with annular air channeling groove 26 between them, define a second air entry path within control casing 6 that leads from air inlet port 24 through connecting passageway 24a to return stroke conduit 5. Similarly, annular intermediate air passages 18d and 18c, with annular air channeling groove 27 between them, define a second air exit path that leads from forward stroke conduit 4 to air discharge port 25.

The manner in which inner wall 6b of control casing 6 cooperates with the air channeling grooves on the slide valve and with the intermediate air passages, as just described, to shield the interior of the piston slide valve from the air flow through control casing 6 is as follows: Pile 18 of elements 19, 20, and 21, which provides a slide valve-receiving channel within the control casing, has an inwardly facing surface that makes at all times an annular, substantially airtight, slidable contact with the outer surface of opposite end portions of the slide valve at 14d and 14e. Likewise, pile 18 has an outwardly facing surface that makes at all times an annular, substantially airtight contact with inner wall 6b of the control casing at 18f and 18g adjacent each of the opposite ends of the slide valve. The four contacts at 14d, 14e, 18f and 18g are at all times located farther axially from the central portion of the slide valve-receiving channel tan are (1) the channeling grooves an the slide valve, (2) all the intermediate air passages, and (3) all opening sin the inner wall of the control casing that lead away from pile 18 of series of elements 19, 20 and 21.

The four annular, substantially airtight contacts at 14d, 14e, 18f and 18g that have just been described are arranged and adapted to isolate the interior space within the piston slide valve (1) from compressed air that enters the air inlet port and passages through one of the first and second air entry paths referred to above, and (2) from outflowing air at a lower pressure that passes through the air exit path that is associated with said one air entry path and from there out through the air discharge port. The space occupied by the slide valve releasable holding means, which in this embodiment comprises indexing grooves 16a and 16b, helical compression springs 17 and spring-biased spherical balls 32, is likewise isolated from the indicated air flow in and out of control casing 6. (packing rings 9, shown toward the left in FIGS. 1-3 and toward the right in FIGS. 2 and 3, protect the interior space within the slide valve from air that might otherwise flow directly out of pneumatic cylinder 1 into the space within the valve, or into the space from its other end.)

Confining the air flow to restricted flow paths as just described provides two important advantages that are not available in the prior art. The first of these is that compression spring 29 within the interior of the slide valve, and compression springs 17 in the releasable holding means for the slide valve, are not subject to long term damage by being repeatedly exposed to bursts of compressed air, or to the lesser long term damage that it is believed can be caused by repeated sudden exposure to the air that exits from the device of this invention at lower pressure.

Second, the force exerted by the compressed air on alternate sides of reciprocating piston 2 is not diluted by expansion into extraneous spaces, or by possible leakage of the high pressure air through various less-than-airtight parts of the mechanism. With the full pressure of the compressed air maintained in the air-operated lubricant pump of this invention, the reversal in the direction of movement of the reciprocating piston rod is significantly faster and more reliable than was possible with any prior art device.

Because of the above described action of helical compression spring 29, and the resulting alternate connection and breaking of the connection between air inlet port 24 and the opposite sides 2a and 2b of pneumatic piston 2 just detailed, the full force of the compressed air that is introduced into this mechanism is automatically—and immediately—available to reverse the direction of movement of reciprocating piston rod 7 from its forward movement or return movement at the exact moment the engagement of holding means 16a/32 or 16b/32, respectively, is released and compression spring 29 snaps slide valve 14 from one of its air inlet positions to the other.

This result is enhanced, as has just been explained, by the fast that the flow of air through the mechanism of this invention is kept out of extraneous spaces within the mechanism, and away from various less-than-airtight parts of the mechanism.

SPRING DIMENSION

This embodiment with third actuator means 33, shown in FIGS. 1-4 and described above, is the preferred form of the device of the present invention because in this embodiment the force required to release the holding means (either 16a/32 or 16b/32) is produced solely by the third actuator, as piston 2 moves in response to the compressed air introduced into pneumatic cylinder 1. This means that it is never necessary to compress compression spring 29 completely in order to apply the requisite releasing force to end portion 14a or 14b of slide valve 14, as is necessary when an axial force exerted by actuator 31a or 31b through the completely compressed spring is relied on to release the holding means.

When third actuator 33 provides the necessary releasing force, compression spring 29 need be compressed only far enough that when the holding means is released the slide valve will be immediately moved from one of its air inlet positions to the other. The fact that the spring need never be completely compressed of course adds greatly to the life of the spring.

In order to ensure that compression spring 29 in this embodiment is never put in its fully compressed condition, its length when fully compressed must be (as will be seen from FIG. 2) less than (1) the length 33a of third actuator 33, plus (2) the second predetermined distance 34 between member 33 and an adjacent shoulder 31 (such as shoulder 31b), less (3) the thickness of a force-transmitting washer 30 (such as washer 30b).

In order to exert the desired axial force to move spherical locating ball 32 from one of the index grooves 16a and 16b across land area 16c to the other index groove immediately after the holding means is released as described above, compression spring 29 in its fully relaxed condition must be (as also seen from FIG. 2) somewhat longer than the sum of (1) length 33a, plus (2) distance 34, less (3) the thickness of one of said force-transmitting washers (such as washer 30b). A better length of the helical compression spring in its relaxed condition is still longer, by an amount at least equal to the first predetermined distance between the center lines of first and second index grooves 16a and 16b. A preferred length for the compression spring in its fully relaxed condition (which is somewhat less than is illustrated in FIGS. 1 and 3) is just less than the distance between shoulders 31a and 31b, minus the thickness of two force-transmitting washers 30.

Other Illustrative Embodiments

Helical Compression Spring Releases Piston Slide Valve Holding Means

If desired, third actuator 33 may be omitted under certain circumstances in which helical compression spring 29 can, acting alone, apply an axially directed force of a magnitude equal to or greater than the predetermined minimum magnitude required to release spherical locating balls 32 from index groove 16a or 16b in FIG. 1. As will be understood from FIG. 2, in the absence of third actuator 33, when piston rod 7 is on its return stroke it will continue its movement to the left until compression spring 29, acting through force-transmitting washer 30a, pushes slide valve 14 to the left within slide valve-receiving chamber 13 to bring end portion 14a of the slide valve against end wall 13a of the chamber.

Similarly, in the absence of third actuator 33, when reciprocating piston rod 7 is on its forward stroke the movement of the rod to the right in FIG. 3 will continue until shoulder 31a, acting through force-transmitting washer 30a, pushes the left-hand end of compression spring 29 far enough to the right that the force applied against end portion 14b of slide valve 14 will disengage spherical balls 32 from index groove 16a, and move the slide valve to the right-hand end of chamber 13 and thereby move the spherical balls into engagement with index groove 16b.

Except when the force required to release holding means 16a/32 or 16b/32 is relatively low, it will usually be necessary with this embodiment that the helical compression spring be pushed by a shoulder of the moving piston rod into its completely compressed condition, with immediately adjacent circular elements of the helical spring in full contact with each other. In this condition, the spring will essentially act as a solid hollow cylinder, and can transmit to end portion 14a or 14b of slide valve 14 whatever axially directed force is required to release holding means 16a/32 or 16b/32 at the opposite end of the slide valve. (The device discussed below of which FIG. 6 is a fragmentary view is one form of this embodiment in which no third actuator means is included.) When the engagement of spherical locating balls 32 with an indexing groove is broken, the helical spring will immediately start to expand to return to its normal uncompressed state, thereby moving the spherical balls out of one indexing groove, across the land area between the two indexing grooves, and into engagement with the other groove.

When this second embodiment under discussion is utilized, it is advantageous to flatten the two sides of the wire comprising the helical compression spring that come into contact with each other when the spring is fully compressed. FIG. 5 is a fragmentary sectional view of such a helical compression spring. Sides 35 and 36 on immediately adjacent circular elements of the helical spring are flattened, so that when the spring is completely compressed one flat surface will abut the other. This configuration will strengthen the helical spring when it acts, as described above, as a solid hollow cylinder when it has been put in its fully compressed condition.

Another expedient to strengthen the helical spring when in its fully compressed condition is to select the diameter of the intermediate reduced section of the reciprocating piston rod and the inside diameter of the cavity within the slide valve so as to confine the helical compression spring rather closely. As will be seen, this will tend to keep the several circular elements that comprise the helical spring in alignment. It is also advantageous to fabricate the helical compression spring of an alloy that is likely to minimize both the metal fatigue and the impact damage that full compression of the spring may tend to produce.

This second embodiment can be used in two situations. It may be used, for example, in a situation in which it is acceptable to have a holding means for the piston slide valve that can be released by a relatively lower axially directed releasing force. In such case, the impact of actuator 31a or 31b on the fully compressed helical spring would not be so great, and could therefore be better tolerated by the spring. Second, if the acceptable releasing force is low enough, it may be possible to use a compression spring of sufficient stiffness that it will actually not need to be fully compressed at any time, but in a partially compressed condition can exert the necessary releasing force itself without having to rely on the first or second actuator 31a or 31b acting through a fully compressed spring.

Force-Transmitting Washers Omitted

In a third embodiment, force-transmitting washers 30a and 30b may be omitted, if desired, provided the dimensions of the intermediate reduced portion of the reciprocating piston rod and the cooperating inner wall of the annular cavity within the piston slide valve are properly selected. FIG. 6 is a fragmentary sectional view of such an embodiment.

Piston slide valve 14' has air channeling, grooves 26' and 27' on its external surface Helical compression spring 29' is slidably held between elongated annular cavity 14c' of the slide valve and reduced portion 12' of reciprocating piston rod 7'.

Sides 35 and 36 on immediately adjacent circular elements of the helical spring are flattened, so that in the completely compressed condition shown in FIG. 6 one flat surface abuts another. In this completely compressed condition, helical spring 29' acts as a solid hollow cylinder. Shoulder 31b' has pushed compression spring 29' to the left in FIG. 6 against end portion 14a' of the slide valve until the spring is fully compressed.

In this third embodiment, the diameter of reciprocating piston rod 7' is preferably just less than the inside diameter of end portion 14a' of slide valve 14'. The difference between the diameter of piston rod 7' and the diameter of its reduced portion 12' is substantially equal to the difference between the inside diameter of end portion 14a' and the inside diameter of elongated angular cavity 14c' of the slide valve. The difference just referred to between the indicated diameters is slightly more than one-half the diameter 37 of the individual circular elements that comprise helical compression spring 29', which allows the compression spring to slide freely within cavity 14c' and still have its individual circular elements held in substantial alignment with each other as are pushed into their fully compressed condition.

Comparison of Various Embodiments

The additional embodiments of the mechanism of this invention described in this section of the specification require fewer mechanical parts than, but operate generally in the same manner as, the preferred embodiment described in the preceding section. The results with the various embodiments described are generally similar, but the preferred embodiment of FIGS. 1-4 has certain distinct advantages.

In the preferred embodiment there is less wear on, or damage to, the helical compression spring because it is never fully compressed. Because of the construction of the preferred embodiment, there is less need to be concerned about maintaining the accurate alignment of the individual circular elements of the helical compression spring. The manufacture of the preferred embodiment is simpler because the tolerances in the fabrication of various interfitting parts are not so close as they are in the second and third embodiments.

Because third actuator 33 is present in the preferred embodiment, the minimum force required to release the slide valve holding means can be greater than when actuator 33 is not included, since release is effected by a force supplied by the third actuator as a completely and permanently solid member. This makes it possible to have a higher spring loading on the spring-biased holding means, resulting in increased reliability of the indexing engagement of the slide valve. Finally, selection of a helical compression spring having the proper composition and cross-sectional shape of the individual circular elements of the spring is a significantly less critical matter when third actuator 33 is present.

METHOD OF ASSEMBLY

Control casing 6 of the preferred embodiment shown in FIGS. 1-3 and described above, and the elements contained in the casing, can be easily and efficiently assembled in any of several ways, of which the following is one example.

First, stabilizing rings 19, packing rings 20 and spacing rings 21 that make up pile 18 can be positioned on slide valve 14.

Second, reciprocating piston rod 7 and the elements carried by it can be assembled by assembling washer 30a, helical compression spring 29, and washer 30b on reduced portion 12 of the piston rod. The reduced portion can then be bolted to the left-hand portion of piston rod 7.

Third, piston rod 7 with the assembled parts mounted on it as just described can be inserted into the main body of control casing 6 and positioned within the opening in pile 18. Right-hand end portion 14b/15 of the slide valve can then be slid onto the right-hand portion of piston rod 7. This portion of the piston rod can then be bolted to reduced portion 12, and part 14b/15 can be screwed into engagement with the main body of the slide valve.

Fourth, flanged neck 11 can then be bolted to the right-hand end of control casing 6, to complete the assembly of these members.

Finally, locating elements 32 can be inserted into access ducts 17b on flanged neck 11, and spring loading members 17a adjusted to hold the locating elements in releasable engagement with either indexing groove 16a or 16b.

Other ways to assemble the disclosed mechanism of this invention will be apparent to those skilled in the art.

While the present invention has been described in connection with the best mode presently contemplated by the inventor for carrying out his invention, the preferred embodiments described and shown are for purposes of illustration only, and are not to be construed as constituting any limitation of the invention. Modifications will be obvious to those skilled in the art, and all modifications that do not depart from the spirit of the invention are intended to be included within the scope of the appended claims.

I claim:

1. In a lubricant pump adapted to deliver lubricant form a lubricant vessel to an outlet bore, a compressed air-operated mechanism for a reciprocating piston rod, which mechanism includes a pneumatic cylinder and a control casing connected thereto, with a piston rod slidably journaled in the walls of the control casing for reciprocating axial movement between a forward position and a return position, said piston rod carrying at one end a compressed air piston having an airtight, slidable contact with the internal surface of the wall of the pneumatic cylinder and at its other end a working extension piece, the walls of said control casing containing a compressed air inlet port and an air discharge port, the inlet port being adapted to supply compressed air to a control device contained within the control casing from which a forward stroke conduit leads to one side of the compressed air piston and from which a return stroke conduit leads to the other side of the compressed air piston, said control device including a piston slide valve mounted for reciprocal axial movement on the piston rod within the control casing, said slide vale being movable, in response to the reciprocating movement of the piston rod, between a first air inlet position in which the slide valve connects the air inlet port to the forward stroke conduit and connects the return stroke conduit to the air discharge port, and a second air inlet position in which the slide valve connects the air inlet port to the return stroke conduit and connects the forward stroke conduit to the air discharge port, characterized by the fact that:

(a) the piston slide valve has the general form of a hollow cylinder with an imperforate wall,
the external surface of said wall defining a plurality of air channeling grooves, spaced axially from each other, to provide interconnection of the air inlet port with one of the forward stroke conduit and the return stroke conduit, depending upon whether the slide valve is in its first air inlet position or its second air inlet position, said slide valve having an inwardly directed flange portion at each end that is positioned in close radial proximity to the reciprocating piston rod when the piston rod is in its midposition between its forward position and its return position, so that the slide valve is movable along the piston rod back and forth between said two air inlet positions of the slide valve, the central portion of the slide valve being spaced from the piston rod to form an elongated cavity of annular cross section within the interior of the slide valve between the piston rod and the generally cylindrical wall of the slide valve, which cavity extends between said inwardly directed flange portions that are located at each end of the slide valve;

(b) a helical compression spring is positioned within the elongated annular cavity in the piston slide valve, said helical spring being adapted, when in a compression condition, to apply an axially directed force to one of said end portions of the slide valve;

(c) means is provided between the slide valve and the inner wall of the control casing (i) to form, when the slide valve is in its first air inlet position, one set of annular, substantially airtight, intermediate air passages that, together with a selected plurality of said air channeling grooves on the piston slide valve, define within the control casing a first air entry path and a first air exit path associated therewith, both of which paths lie entirely outside the elongated cavity within the interior of the slide valve, and (ii) to form, when the slide valve is in its second air inlet position, another set of annular, substantially airtight, intermediate air passages that, together with another selected plurality of air channeling grooves on the piston slide valve, define within the control casing a second air entry path and second air exit path associated therewith, both of which latter paths lie entirely outside the elongated cavity within the interior of the slide valve.

said passage-forming means having an inwardly facing surface that makes at all times an annular, substantially airtight, slidable contact with the outer surface of each of the opposite end portions of the slide valve to provide a slide valve-receiving channel within the control casing, and having an outwardly facing surface that makes an annular, substantially airtight contact with the inner wall of the control casing adjacent each of the opposite ends of the slide valve, all said four annular, substantially airtight contacts being at all times located farther axially from the central portion of the slide valve-receiving channel than are (i) said channeling grooves on the slide valve, (ii all said intermediate air passages, and (iii) all openings in the inner wall of the control casing that lead away from said intermediate air passage-forming means, and being arranged and adapted to isolate at all times the helical compression spring positioned in the interior space within the generally cylindrical slide valve from compressed air that enters the air inlet port and passages through whichever one of said first and second air entry paths is present as determined by whether the piston slide valve is in its first or second air inlet position, and from outflowing air at lower pressure that passes through the air exit path that is associated with said one air entry pat and from there out through the air discharge port;

(d) means is provided for releasably holding the piston slide valve in one or the other of its first and second air inlet positions, said two positions being separated by a first predetermined distance measured along the piston rod, said holding means being adapted to be released by the application to the slide valve of an axially directed force of at least a predetermined minimum magnitude, the length of said slide valve-receiving chamber in the control casing being at least substantially equal to the external length of the slide valve plus said first predetermined distance between the first and second air inlet positions of the slide valve;

(e) first actuator means is positioned on the reciprocating piston rod for pushing the helical compression spring against one of said end portions of the slide valve from within said elongated cavity in the interior of the piston slide valve, when the piston rod moves in a given direction, to place the spring in a compressed condition;

(f) second actuator means is positioned on the reciprocating piston rod for pushing the helical compression spring against the other of said slide valve end portions from within said elongated cavity in the interior of the piston slide valve, when the piston rod moves in the opposite direction, to place the spring in a compressed condition; and (g) means is provided for releasing said holding means by applying to the piston slide valve an axially directed force of at least said predetermined minimum magnitude, first in one direction and then in the opposite direction, as the reciprocating piston rod moves alternately through its forward stroke and then through its return stroke, whereby compressed air, introduced from the air inlet port through one of the forward stroke conduit and the return stroke conduit into the pneumatic cylinder on the side of the compressed air piston associated with said one conduit, will push the compressed air piston and its piston rod toward the opposite side of the compressed air piston to move one of said first and second actuator means axially to compress the helical compression spring against a given one of said end portions of the piston slide valve, so that when the holding means is released the compressed helical compression spring immediately starts to expand and move the slide valve from one of its air inlet positions to the other of said positions, and neither the compressed air entering the air entry port and flowing through one of said air entry paths to one side of the compressed air piston nor the outflowing air that flows at power pressure from the other side of the piston through the air exit path associated with said one air entry path and out the air discharge port comes into contact with the helical compression spring within the piston slide valve.

2. The device of claim 1 in which the reciprocating piston rod, helical compression spring, first actuator means and second actuator means are all positioned concentrically within the elongated annular cavity formed by the piston slide valve.

3. The device of claim 1 in which said first and second actuator means are fixedly positioned on the reciprocating piston rod.

4. The device of claim 1 in which the reciprocating piston rod is slidably journaled, with a substantially airtight, slidable seal, in the wall of the control casing that is adjacent the pneumatic cylinder.

5. The device of claim 4 in which the reciprocating piston rod is journaled, with a substantially airtight, slidable seal, in the wall of the control casing that is remote from the pneumatic cylinder.

6. The device of claim 1 in which said four annular, substantially airtight contacts are arranged and adapted to isolate the slide valve releasable holding means (i) from compressed air that enters the air inlet port and passages through whichever one of said first and second air entry paths is present as determined by whether the piston slide valve is in its first or second air inlet position, and (ii) from outflowing air at lower pressure that passes through the air exit path associated with said one air entry path and from there out through the discharge port.

7. The device of claim 1 in which the piston slide valve is rotatable around the reciprocating piston rod.

8. The device of claim 1 in which each of said plurality of air channeling grooves on the exterior surface of the piston slide valve extends continuously, without interruption, around the slide valve.

9. The device of claim 8 in which each of said channeling grooves lies in a single plane positioned at right angles to the longitudinal axis of the piston slide valve.

10. The device of claim 9 in which there are three of said air channeling grooves on the exterior surface of the piston slide valve.

11. The device of claim 10 in which the helical compression spring is adapted in a compressed condition to (a) apply to one of said end portions of the slide valve a force of at least said predetermined minimum magnitude to release said holding means, and (b) immediately expand to complete the movement of the slide valve from one of its air inlet positions to the other of said positions.

12. The device of claim 11 in which:
(a) the reciprocating piston rod has a portion within said slide valve elongated cavity that has a reduced diameter, and
(b) each of the portions of the reciprocating piston rod lying adjacent said reduced portion forms a shoulder where it joins the reduced portion of the rod, said shoulders comprising said first and second actuator means.

13. The device of claim 10 in which third actuator means is positioned between said first and second actuator means, on the portion of the reciprocating piston rod that is located within said annular cavity formed by the piston slide valve, for applying to one of said end portions of the slide valve an axially directed force of at least said predetermined minimum magnitude to release said holding means.

14. The device of claim 13 in which the reciprocating piston rod, helical compression spring, first actuator means, second actuator means and third actuator means are all positioned concentrically within the elongated annular cavity formed by the piston slide valve.

15. The device of claim 13 in which:
(a) the reciprocating piston rod has a portion within said slide valve elongated cavity that has a reduced diameter,
(b) each of the portions of the reciprocating piston rod lying adjacent said reduced portion forms a shoulder where it joins the reduced portion of the rod, said shoulders comprising said first and second actuator means, and
(c) an enlarged portion positioned on the reciprocating piston rod in the midsection of the reduced portion of the rod comprises said third actuator means, said enlarged portion (i) having a maximum outside dimension smaller than the inside diameter of the helical compression spring, and (ii) being spaced at a second predetermined distance from each of said shoulders.

16. The device of claim 12 or 15 in which an annular shaped washer is slidably carried by the reduced portion of the reciprocating piston rod, adjacent each of said shoulders, for transmitting axially directed forces, each of said washers having (a) an outside diameter that is larger than the inside diameter of the end portions of the slide valve that are in close proximity to the reciprocating piston rod, and (b) an inside diameter that is smaller than the outside diameter of the helical compression spring.

17. The device of claim 12 or 15 in which the releasable holding means is comprised of:
   (a) two index means spaced from each other, along the external surface of the piston slide valve, by said first predetermined distance, and
   (b) at least one cooperating locating element adapted to be engaged with one or the other of the index means until it is disengaged by the application to the piston slide valve of said axially directed force of predetermined minimum magnitude.

18. The device of claim 17 in which said two index means and said at least one locating element of the releasable holding means are positioned at one end of the piston slide valve.

19. The device of claim 18 in which:
   (a) the releasable holding means is comprised of at least one spring-locking mechanism in which the locating element is at least one spring-biased spherical ball contained within the walls of the control casing, and
   (b) each of said two index means is a groove extending around the external surface of the piston slide valve.

20. The device of claim 19 in which the releasable holding means includes a plurality of spring-biased locating spherical balls that are (a) positioned in a plane normal to the axis of the piston rod, (b) spaced circumferentially around the external surface of the piston slide valve, and (c) normally biased into engagement with one or the other of, said, two grooves.

21. The device of claim 19 in which the spring biasing of said at least one spherical ball includes means for adjusting the spring loading as desired, said adjusting means being accessible from outside the device through an access duct in the control casing.

22. The device of claim 12 or 15 in which:
   (a) three air channeling grooves spaced axially from each other are disposed along the external surface of the piston slide valve,
   (b) the middle groove of said three air channeling grooves is connected at all times to the air discharge port in the walls of the control casing,
   (c) the air channeling groove at each end of the three grooves is connected at all times to the compressed air inlet port in the walls of the control casing,
   (d) the air channeling groove at one end of the three grooves is in addition connected to said forward stroke conduit, as a part of said first air entry path located within the control casing immediately adjacent the piston slide valve, when the slide valve is in its first air inlet position, and is disconnected from the forward stroke conduit when the slide valve is in its second air inlet position,
   (e) the air channeling groove at the other end of the three grooves is in addition connected to said return stroke conduit, as a part of said second air entry path located within the control casing immediately adjacent the piston slide valve, when the slide valve is in its second air inlet position, and is disconnected from the return stroke conduit when the slide valve is in its first air inlet position,
   (f) the return stroke conduit is connected to the discharge port, through the middle groove as a part of said first air exit path located within the control casing immediately adjacent the piston slide valve, when the piston slide valve is in its first air inlet position, and
   (g) the forward stroke conduit is connected to the discharge port, through the middle groove as a part of said second air exit path located within the control casing immediately adjacent the piston slide valve, when the piston slide valve is in its second air inlet position.

23. The device of claim 22 in which said intermediate air passages within the control casing immediately adjacent the piston slide valve are formed by a pile of a repeating series of elements, each of said series of elements including the following three elements arranged side by side, in the order indicated, along the piston rod:
   (a) an annular stabilizing ring,
   (b) an annular packing ring, and
   (c) an annular spacing ring, each spacing ring, except for the spacing ring in the last series of elements in said pile, having projections extending to the adjacent stabilizing ring to partially fill the space between the spacing ring and said adjacent stabilizing ring and form air passages of generally annular shape.

24. The device of claim 22 in which said air channeling grooves are located along the external surface of the piston slide valve in axially fixed positions spaced from each other.

25. The device of claim 15 in which:
   (a) an annular shaped washer is slidably carried by the reduced portion of the reciprocating piston rod, adjacent each of said shoulders, for transmitting axially directed forces,
   (b) said releasable holding means is comprised of (i) two index means spaced from each other, along the external surface of the piston slide valve, by said first predetermined distance, and (ii) at least one cooperating locating element adapted to be engaged with one or the other of the index means until it is disengaged by the application to the piston slide valve of said axially directed force of predetermined minimum magnitude, and
   (c) the helical compression spring in its fully relaxed condition is longer than the sum of (i) the length of said third actuator means, plus (ii) the distance between the third actuator means and the adjacent one of said two shoulders, plus (iii) said predetermined distance between said two index means, less (iv) the thickness of one of said force-transmitting washers.

26. The device of claim 25 in which the length of the helical compression spring when the spring is fully compressed is less than (a) the length of said third actuator means, plus (b) said second predetermined distance between the third actuator means and the adjacent one of said two shoulders, less (c) the thickness of one of said two force-transmitting washers.

27. The device of claim 15, in which:
   (a) an annular shaped washer is slidably carried by the reduced portion of the reciprocating piston rod, adjacent each of said shoulders, for transmitting axially directed forces, each washer having (i) an outside diameter that is larger than the inside diameter of the end portions of the slide valve that are in close proximity to the reciprocating piston rod, and (ii) an inside diameter that is smaller than the outside diameter of the helical compression spring, (b) the releasable holding means is comprised of (i) two index grooves extending around the external surface of the piston slide valve at one end thereof and spaced from each other by said first predetermined distance, (ii) at least one cooperating locating element in the form of a spring-biased spherical ball positioned within the walls of the control casing, said at least one locating element being adapted to be engaged with one or the other of the two index grooves until it is disengaged by the application to the piston slide valve of said axially directed force of a predetermined minimum magnitude, (c) means is provided for adjusting the spring loading of said at least one spherical ball as desired, said adjusting means being accessible from outside the device through an access duct in the control casing, (d) three air channeling grooves spaced axially from each other are disposed along the external surface of the piston slide valve, the middle groove of said three air channeling grooves being connected at all times to the air discharge port in the walls of the control casing and the air channeling groove at each end of the three grooves being connected at all times to the compressed air inlet port, the air channeling groove at one end of the three grooves being in addition connected to said forward stroke conduit, through intermediate passages located within the control casing immediately adjacent the piston slide valve, when the slide valve is in its first air inlet position, and being disconnected from the forward stroke conduit when the slide valve is in its second air inlet position, the air channeling groove at the other end of the three grooves being in addition connected to said return stroke conduit, through intermediate passages located within the control casing immediately adjacent the piston slide valve, when the slide valve is in its second air inlet position, and being disconnected from the return stroke conduit when the slide valve is in its first air inlet position, the return stroke conduit being connected to the discharge port when the piston slide valve is in its first air inlet position, and the forward stroke conduit being connected to the discharge port when the piston slide valve is in its second air inlet position, said intermediate passages within the control casing immediately adjacent the piston slide valve being defined by a pile of a repeating series of elements, each of said series of elements including (i) an annular stabilizing disk, (ii) an annular packing ring, and (iii) an annular spacing ring, all arranged side by side, in the order indicated, along the piston rod, each spacing ring, except for the spacing ring in the last series of elements in the pile, having projections extending to the adjacent stabilizing ring to partially fill the space between the spacing ring and said adjacent stabilizing ring and form air passages of generally annular shape, (e) the length of the helical compression spring in its fully relaxed condition is greater than the sum of (i) the length of said third actuator means, plus (ii) the distance between the third actuator means and the adjacent one of said two shoulders, plus (iii) said predetermined distance between said two index means, less (iv) the thickness of one of said force-transmitting washers, and (f) the length of the helical compression spring in its fully compressed condition is less than (i) the length of said third actuator means positioned on the reciprocating piston rod, plus (ii) said second predetermined distance between the third actuator means and the adjacent one of said two shoulders, less (iii) the thickness of one of said force-transmitting washers.

28. The device of claim 13 in which said third actuator means is fixedly positioned on the reciprocating piston rod.

* * * * *